United States Patent

Pfalzgraf et al.

[11] Patent Number: 5,476,078
[45] Date of Patent: Dec. 19, 1995

[54] METHOD OF OPERATING A THROTTLE-VALVE ADJUSTMENT DEVICE

[75] Inventors: Manfred Pfalzgraf, Kronberg; Rüdiger Müller, Gernsheim; Andreas Klemt, Kelkheim, all of Germany

[73] Assignee: VDO Adolf Schindling AG, Frankfurt, Germany

[21] Appl. No.: 327,058

[22] Filed: Oct. 21, 1994

[30] Foreign Application Priority Data

Oct. 22, 1993 [DE] Germany .......................... 43 36 038.6

[51] Int. Cl.$^6$ ................ F02D 3/02; B60K 26/04
[52] U.S. Cl. .............. 123/399; 73/118.1; 123/198 D
[58] Field of Search ................ 123/198 D, 333, 123/335, 361, 399, 479, 339.15; 73/118.1

[56] References Cited

U.S. PATENT DOCUMENTS

| | | | |
|---|---|---|---|
| 4,722,313 | 2/1988 | Kohler et al. | 123/494 |
| 4,920,939 | 5/1990 | Gale | 123/479 X |
| 5,065,721 | 11/1991 | Wiggins et al. | 123/479 X |
| 5,213,078 | 5/1993 | Kolberg et al. | 123/399 |
| 5,321,980 | 6/1994 | Hering et al. | 73/188.1 |

FOREIGN PATENT DOCUMENTS

| | | |
|---|---|---|
| 0369061 | 5/1990 | European Pat. Off. . |
| 3900437 | 11/1989 | Germany . |

*Primary Examiner*—Tony M. Argenbright
*Attorney, Agent, or Firm*—Martin A. Farber

[57] ABSTRACT

A test routine for a throttle-valve displacement device is accomplished by use of a potentiometer (6) associated with a setting drive (3) and a potentiometer (5) associated with the throttle valve (1) to determine if the valve is operating properly. If it is found from a comparison of the potentiometer signals that the throttle valve (1) is connected to the gas pedal (2), then the setting drive is moved at specific time intervals at least once in closing direction and then back into the starting position, and it is tested whether the throttle valve (1) follows the setting device. If so, then there is an erroneous indication of one of the two potentiometers and safety measures can be taken.

10 Claims, 2 Drawing Sheets

METHOD OF OPERATING A THROTTLE-VALVE ADJUSTMENT DEVICE

FIELD AND BACKGROUND OF THE INVENTION

The invention relates to a method of operating a displacement device for the throttle valve (1) of an internal combustion engine of a motor vehicle, wherein the throttle valve (1) can be displaced in an opening direction by a gas pedal (2) and, alternatively, by an electromotive setting drive (3) against the force of a return spring (4). A first potentiometer (5) is provided to produce a signal which represents the position of the throttle valve, a second potentiometer (6) is provided to produce a signal representing the position of the setting drive (3), and an electronic control device (7) is provided to process these and other signals and to control the setting drive.

Such displacement devices are used for automatic idling control and also for automatically maintaining a predetermined driving speed. In both cases, when the gas pedal is completely released the throttle valve is displaced by the electronic control device and the electromotive setting device as a function of the instantaneous need for idling power or the difference between actual and predetermined speed of the vehicle.

If such displacement devices are used only for regulating idling, the setting range of the electromotive setting drive can be limited in opening direction in simple manner by means of a mechanical stop. In this way, assurance is had that, in case of a fault in the setting drive, the corresponding potentiometer, or the electronic control device, the throttle valve can be opened electromotively with maximum opening limited by this stop. If the displacement devices, however, are used for the automatic maintenance of a predetermined speed, the setting range of the electromotive setting drive must extend over the entire setting range of the throttle valve from a position of minimum idling powers $LL_{min}$ via a position for maximum idling power $LL_{max}$ up into the full-load position VL. In case of a defect, therefore, unintended displacement of the throttle valve up into regions which are important from a safety standpoint is possible.

Various proposals have already been made for the avoidance of such risks. Thus, for instance, safety contacts can be provided which are associated with given positions of gas pedal, of the electromotive setting drive or of the throttle valve and which, either alone or in combination with signal values of the potentiometers, permit plausibility tests. These tests, upon detection of a defect, produce the disconnecting of the electromotive setting drive, including at least a displacement of the throttle valve in the direction of closing (see Europe 0369 061 B1 and German 39 00 437 C1).

Since the safety contacts themselves, however, represent a new source of error and since they are relatively expensive due to the high quality requirements, and can be adjusted only at considerable expense, it is desired to solve the safety problems in a manner which is more favorable in price and simpler in construction.

SUMMARY OF THE INVENTION

It is an object of the invention to provide a possibility by which errors in the potentiometer signals which are important from a standpoint of safety can be noted at the smallest possible expense.

According to the invention, the functionality of the potentiometers (5, 6) is periodically checked at predeterminable time intervals in a manner wherein the setting drive (3) is displaced from its instantaneous position at least once in the direction of closing, and back into the instantaneous position when the throttle valve (1) is in the setting region above the maximum idling position. It is concluded from movement, in the same direction, of the setting drive (3) and the throttle valve (1) that there is an error in one of the two potentiometer signals.

An erroneous indication by a potentiometer is present when an electric acknowledgement signal no longer represents the position of the throttle valve or of the setting drive. Since it is extremely improbable that both potentiometers will produce an erroneous indication at the same time, a total of four possibilities of error are realistic. Each of the two potentiometers can indicate a position which is too high or too low as compared with the actual conditions. As will be shown further below, from a standpoint of safety, there is to be considered only the event that the second potentiometer indicates too low a position of the setting drive. If the first potentiometer indicates too high a position, a dangerous driving situation cannot result. This error, to be sure, cannot be distinguished by the invention from the above-mentioned error. For simplicity of the testing method, the fact however is tolerated that even uncritical error indications can lead to the consequences set forth in features of the invention providing in the event of an erroneous indication, the setting drive (3) is disconnected or is actuated in the closing direction of the throttle valve (1), or the feeding of fuel to the internal-combustion engine is throttled, or the ignition system of the internal-combustion engine is controlled in the direction of a reduced power output.

By the method of the invention, the monitoring of the potentiometers can be carried out without great expense. Above the maximum idling position of the throttle valve or in the case wherein the difference between the signal values of the first and the second potentiometers (5, 6) has exceeded a predeterminable amount, operability is periodically checked. Also, the setting drive is displaced, within a special test program, from its instantaneous position at least once in the direction of closing and back again into the instantaneous position. The conditions for the starting of the monitoring procedure are that the throttle valve has been displaced in the direction of opening by the gas pedal and that the electromotive setting drive cannot effect a displacement of the throttle valve. If the electromotive setting drive is now displaced at least once—and preferably up to five times— from its instantaneous position in the direction of closing and back again into the instantaneous position, it can then be concluded, from the fact that the throttle valve is displaced in the same direction during this monitoring program, that either the throttle-valve potentiometer indicates too high a position or the setting-drive potentiometer indicates too low a position.

In other words, whenever there results from the potentiometer signals that the throttle valve is connected to the gas pedal, it is checked whether the throttle valve responds to a movement of the electromotive setting drive. If no reaction takes place, it can be assumed that the indications of the potentiometers are correct, but if the throttle valve moves in the same direction as the setting drive, an erroneous indication must be present. The solution proposed by this invention does not require any safety contacts or other parts. It is based solely on a special test program from the result of which the necessary conclusions can be drawn.

A feature of the invention provides, however, that the operability is periodically checked when the difference between the signal values of the first and second potentiometers (5, 6) has exceeded a predeterminable amount.

According to another feature of the invention, the time intervals for the periodic testing are varied in a manner inversely proportional to the speed of the vehicle.

Still according to a further feature of the invention, in the event of an erroneous indication, the setting drive (3) is disconnected or is actuated in the closing direction of the throttle valve (1).

Also, there is a feature that, in the event of an erroneous indication, the feeding of fuel to the internal-combustion engine is throttled.

Yet, the invention provides that, in the event of an erroneous indication, the ignition system of the internal-combustion engine is controlled in the direction of a reduced power output.

Another aspect of the invention is that erroneous indications are stored in suitable manner as a memory in the electronic control device (7), and kept on hand ready to be called for by a diagnostic device.

Still further, the invention provides displacement devices in connection with which the potentiometers (5, 6) are replaced by other suitable position-indicating devices.

BRIEF DESCRIPTION OF THE DRAWINGS

With the above and other objects and advantages in view, the present invention will become more clearly understood in connection with the detailed description of a preferred embodiment, when considered with the accompanying drawing, in which.

DETAILED DESCRIPTION OF THE PREFERRED EMBODIMENT

In order to explain the functions of throttle-valve displacement devices, it has been the practice to employ the so-called linear representation in which the rotary movement necessary for the change in the position of the throttle valve is converted into a linear movement in order to facilitate an understanding of the various interrelationships. For this purpose, structural details are suppressed in favor of emphasizing the functions.

Figure 1:
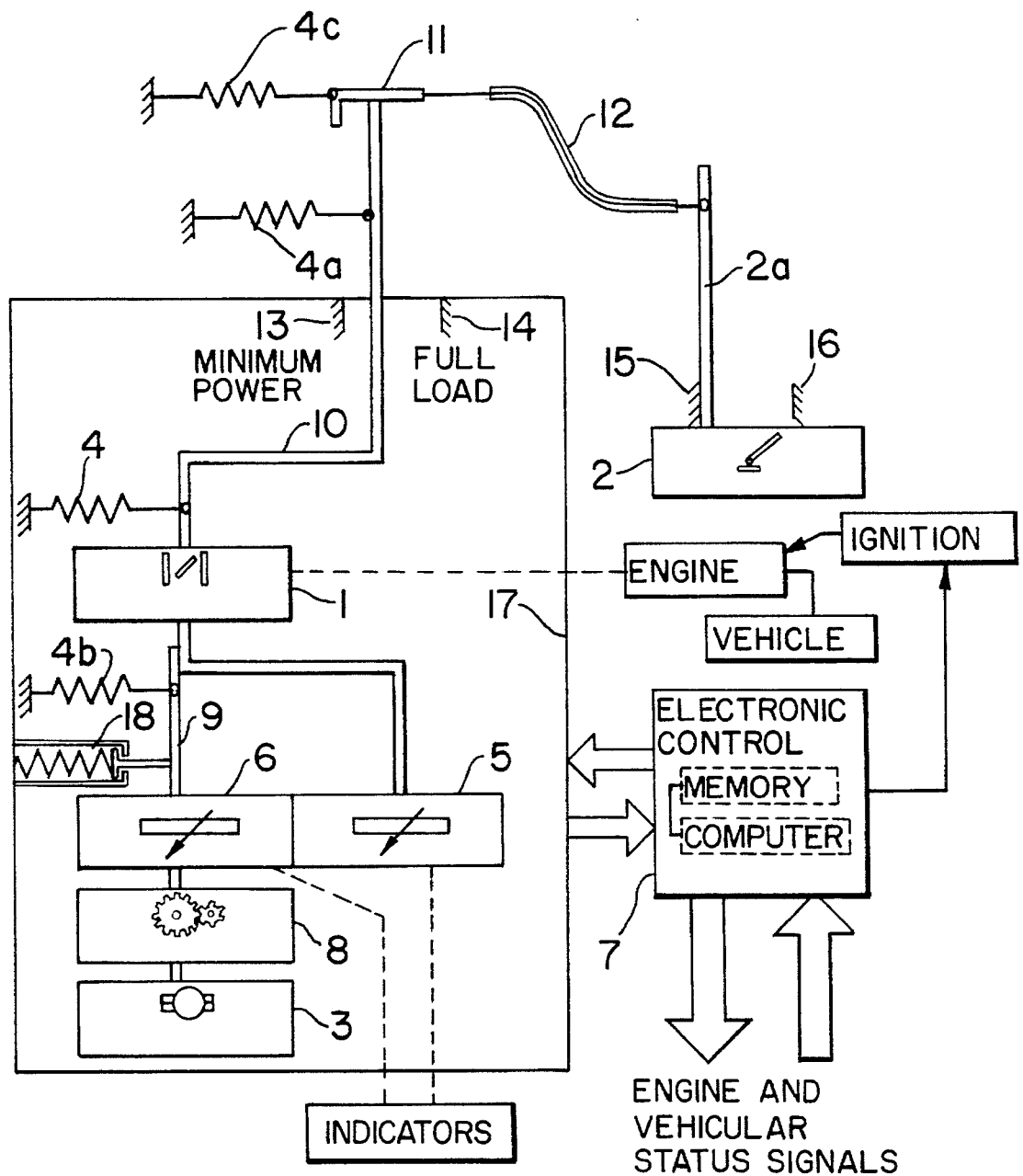
FIG. 1 shows, in simplified form, a displacement device for the carrying out of the method of the invention.

In accordance with FIG. 1, the lever 10 which is connected, fixed for rotation, with the throttle-valve shaft can be driven from left to right, i.e. in the opening direction of the throttle valve 1, either by the gas pedal 2 via lever 2a, cable 12 and drive hook 11 or by the setting drive 3 via gearing 8 and lever 9 with the tensioning of the return spring 4. The "or" condition is realized by mechanical uncoupling. If the throttle valve 1 is driven by the gas pedal 2, the lever 9 remains in the position shown. If the throttle valve 1 is carried along by the setting drive 3, the drive hook 11 remains in the position shown. The throttle valve position shown is assumed under the influence of an emergency travel spring 18 if the gas pedal 2 is completely released and the setting drive 3 is disconnected.

For safety reasons, the return spring 4 is backed up by a second return spring 4a which acts in the same manner. The springs 4b and 4c provide that the lever 9 and the drive hook 11 assume a defined position of rest. The springs 4, 4a, 4b are weaker than the emergency spring 18. The latter can be cocked in closing direction by the setting drive 3. Together, the springs 4, 4a and 4b provide that the throttle valve 1 assumes a well-defined emergency position in the event of the failure of the setting drive 3. The setting region of the lever 10 is limited by a stop 13 for minimum idling power and by a stop 14 for full load. The same applies to the stops 15 and 16 with respect to the lever 2a of the gas pedal 2.

The parts arranged within the frame 17 are customarily developed as a structural unit which is connected by wires to an electronic control device 7.

A potentiometer 6 is associated with the lever 9 of the setting drive 3 and a potentiometer 5 is associated with the throttle valve 1. If both potentiometers 5, 6 are operating properly, the following can be read from their signals $S_5$, $S_6$:

$S_5 > S_6$: Lever 9 is not on the lever 10; the throttle valve 1 is connected to the gas pedal 2.

$S_5 = S_6$: Lever 9 is present on the lever 10; the throttle valve 1 is connected to the setting drive or it is closed.

$S_5 < S_6$: This can only be an erroneous indication since the lever 9 cannot pass through the lever 10.

$S_5 > K$: If the electronic control device is not switched to "maintaining of a given speed", it can be concluded from the comparison with a given limit value K, that the throttle valve 1 is no longer in the idling range and is therefore no longer connected to the setting drive 3 but rather to the gas pedal 2.

In accordance with the invention it is now provided that, with $S_5 > K$ or $S_5 > S_6$, a test routine is carried out by a computer in the control device 7 in order to detect a possible erroneous indication of one of the potentiometers. In this connection, critical and non-critical erroneous indications are further to be distinguished.

If the potentiometer 6 shows too high a value as compared with the actual position of the setting drive 3, the setting drive is moved in closing direction. This can have the result that the idle control no longer operates and that the internal-combustion engine stalls. Since one always has the possibility of keeping the throttle valve 1 open via the gas pedal, this error leads at most to a reduction in comfort.

This is true also upon switching to automatic speed control. The driver notes that a predetermined speed is not being automatically maintained and that he must actively establish the desired speed by means of the gas pedal 2. To this extent also, there is concerned merely a reduction in comfort which is not important from a safety standpoint. The driver can note the errors readily and go to a garage upon the next opportunity.

The same is true if the potentiometer 5 displays too low a value as compared with the actual position of the throttle valve 1. As long as $S_5$ is still greater than $S_6$, the erroneous display is still unimportant from a safety standpoint since speed of rotation and driving speed depend on the actual position of the throttle valve 1 and it is seen to, via the control device, that the actual position of the throttle valve 1 is corrected until the intended idling speed or the driving speed set is reached. Furthermore, it is not excluded in the case of this misindication that upon a change in the operating conditions $S_5$ becomes smaller than $S_6$, which is automatically recorded as an erroneous indication.

Thus there remain the possibilities of error that the potentiometer 5 indicates too much or that the potentiometer 6 indicates too little. In this connection, the first case is not important from the standpoint of safety. With the method of the invention it, however, leads to the same consequences as the second case, which is critical from a safety standpoint. If $S_5 > K$ or $S_5 > S_6 + x$ then at predetermined intervals the setting drive is displaced at least once in closing direction and back into the starting position and it is checked whether the throttle valve "goes along with it", or, equivalently, whether the potentiometers 5 and 6 in this connection indicate movement in the same direction. Therefore, x is an adjustable value with which any tolerances in the potentiometer indications can be taken into account. If movement in the same direction is noted, an erroneous indication must be present since, with properly operating potentiometers 5, 6, the above-mentioned conditions mean that the throttle valve 1 is connected to the gas pedal 2 and cannot respond to a change in position of the setting drive 3. If movement in the same direction is noted, one can react, for instance, in accordance with features of the invention providing in the event of an erroneous indication, by providing that the setting drive (3) is disconnected or is actuated in the closing direction of the throttle valve (1), or that the ignition system of the internal-combustion engine is throttled, or that the ignition system of the internal-combustion engine is controlled in the direction of a reduced power output. This mitigates critical conditions of driving or prevents them entirely.

Figure 2:
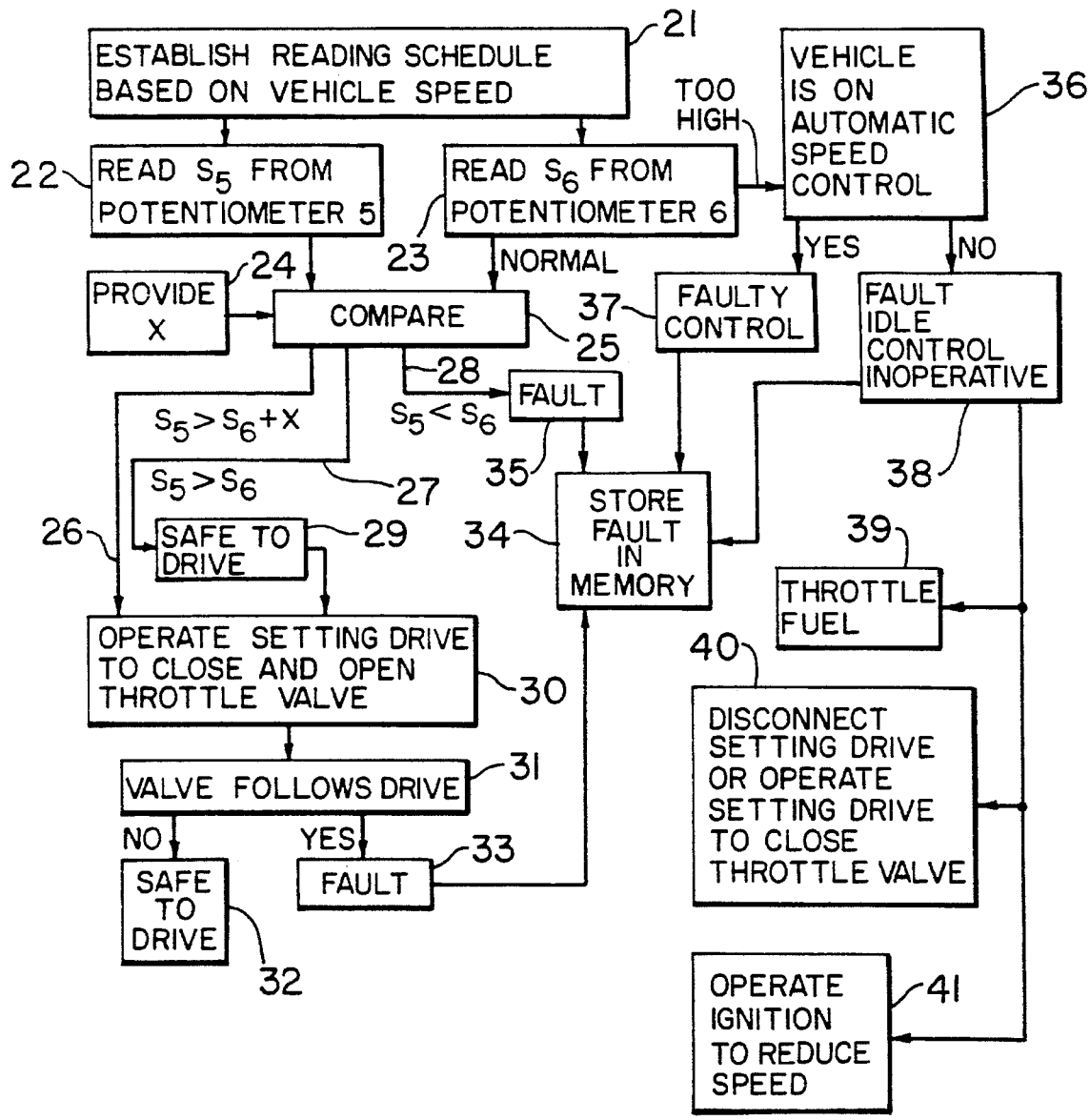
FIG. 2 is a block diagram of a test procedure of the invention.

The methodology described hereinabove is summarized in the diagram of FIG. 2. At block 21, a schedule for reading output signal of the potentiometers 5 and 6 is established, wherein intervals between the readings decrease in duration upon an increase in vehicular speed. It is noted that, in the practice of the invention, the shaft angle signal provided by the potentiometers may be provided by other indicators of shaft angle such as optical or magnetic shaft angle encoders. Blocks 5 and 6 in FIG. 1 are intended to be representive of any such signaling device. The shaft angle of the throttle valve, represented by $S_5$, is read at block 22, and the shaft angle directed by the setting device, represented by $S_6$, is read at block 23. The value x is provided at block 24 for use in the comparison step at block 25. The signal $S_5$ and $S_6$ are compared at block 25, and outputs from the comparison are provided on lines 26, 27 and 28, the outputs being identified in FIG. 2 by algebraic legends.

The situation on line 27, wherein it is safe to drive the vehicle, as indicated in block 29, is applied to block 30 to initiate operation of a test mode of the setting drive. Also for the situation on line 26, the test mode of block 30 is initiated. An observation is made at block 31 as to whether the throttle valve follows the setting drive rather than the gas pedal which is normally followed. If the valve operates independently of the drive, the vehicle is safe to operate as indicated at block 32. If the valve appears to be tied to the drive, there is a fault, as indicated at block 33, the fault being stored in a memory at block 34 for future use in diagnostic procedures to be performed on the vehicle.

With respect to the comparison at block 25, the situation of line 28 is indicative of a fault, shown at block 35, the fault being stored in the memory, at block 34, for use in future diagnostics. If the reading of $S_6$ in block 23 is too high, it is checked at block 36, as to whether the vehicle is being operated on automatic speed control mode. If so, a fault is present, block 37, and is stored in the memory at block 34. If the vehicle is not on automatic speed control, there is a fault in the idle control, indicated at block 38, the fault being stored in the memory at block 34 for future diagnostics. Also, in view of the fault at block 38, one or more of the following remedial actions are taken, namely, a throttling of fuel at block 39, a disconnecting of the setting drive as indicated at block 40, and an operation of the ignition to reduce engine speed as shown at block 41.

We claim:

1. A method of operating a displacement device for the throttle valve of an internal combustion engine of a motor vehicle, wherein the displacement device permits a displacement of the throttle valve in the opening direction, alternatively, by a gas pedal and by an electromotive setting drive against the force of a return spring, wherein the displacement device includes a first potentiometer to provide a first signal representing the position of the throttle valve and a second potentiometer to provide a second signal representing the position of the setting drive, the displacement device having an electronic control device to process the first and the second signals for controlling the setting drive;

the method comprising the steps of:

periodically testing the functionality of the first and the second potentiometers at predeterminable time intervals, said testing being accomplished by displacing the setting drive from its instantaneous position at least once in the direction of a closing of the throttle valve and back into the instantaneous position upon a location of the throttle valve in a setting region above the maximum idling position; and evaluating from movements in like direction of the setting drive and the throttle valve as to the presence of an error in one of said first and said second potentiometer signals.

2. A method according to claim 1, further comprising a step of determining if a difference between the values of the first and the second potentiometer signals has exceeded a predetermined amount; and checking operability of the setting drive periodically upon an exceeding of the predetermined amount by said difference between the first and the second signals.

3. A method according to claim 1, wherein, in said steps of testing functionality of the first and the second potentiometers, the time intervals for periodic testing are varied in a manner inversely proportional to the speed of the vehicle.

4. A method according to claim 2, wherein, in said steps of testing functionality of the first and the second potentiometers, the time intervals for periodic testing are varied in a manner inversely proportional to the speed of the vehicle.

5. A method according to claim 1, wherein, upon determination of said error in one of said potentiometer signals, there is a step of disconnecting the setting drive.

6. A method according to claim 1, wherein, upon determination of said error in one of said potentiometer signals, there is a step of activating the setting drive in a closing direction of the throttle valve.

7. A method according to claim 1, wherein, upon determination of said error in one of said potentiometer signals, there is a step of throttling a feeding of fuel to the internal-combustion engine.

8. A method according to claim 1, wherein, upon determination of said error in one of said potentiometer signals, there is a step of controlling an ignition system of the internal-combustion engine for a reduced power output.

9. A method according to claim 1, wherein, upon determination of said error in one of said potentiometer signals, there is a step of storing an error indication in a memory of the electronic control device to be called for by a diagnostic device.

10. A method according to claim 1, wherein, in said testing step, the function of displacement measurement of the setting device and the throttle valve is accomplished by position-indicating devices.

* * * * *